3,112,304
DISPERSE AZO DYESTUFFS
Otto Senn, Arlesheim, Basel-Land, Switzerland, assignor to Sandoz Ltd. (also known as Sandoz A.G.), Basel, Switzerland
No Drawing. Filed Sept. 20, 1960, Ser. No. 57,119
Claims priority, application Switzerland Sept. 23, 1959
6 Claims. (Cl. 260—207)

This invention relates to disperse dyestuffs of low water solubility which contain at least one mono- or dinuclear aromatic acyl radical, which radical itself contains at least one low molecular halogenalkyl group and is combined with the dyestuff radical through a nitrogen atom. N-acyl radicals of this type are e.g. groups of the formula

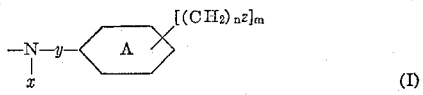

wherein
$x$ represents hydrogen or low molecular alkyl which may be substituted,
$y$ —CO— or —SO$_2$—,
$z$ halogen, and
$n$ and $m$ denote low integers, and wherein the nucleus A may contain further substituents.

The process for the production of the new disperse dyestuffs consists in condensing organic dyestuffs which contain at least one amino group with an exchangeable hydrogen atom, or organic compounds which contain at least one amino group with an exchangeable hydrogen atom plus at least one substituent capable of dyestuff formation, with a functional derivative of an aromatic mono- or dinuclear acid which bears at least one low molecular halogenoalkyl group, whereupon the reaction products formed, when they contain radicals of organic compounds capable of dyestuff formation, are converted into water-insoluble dyestuffs by a suitable reaction, the reactants being so chosen that the final products are free from carboxylic acid and sulfonic acid groups.

A preferred mode of operation of the process is to carry out the condensation with aromatic acid halides of the formula

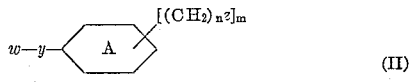

wherein
$y$ denotes —CO— or —SO$_2$—,
$z$ and $w$ halogen,
$n$ and $m$ low integers, and wherein the nucleus A may contain further substituents.

The new process is applicable with several classes of organic disperse dyestuffs which are of low water solubility. Those of primary interest for the process contain at least one amino group; examples of these dyes are aminomonoazo, aminodisazo and aminonitro dyestuffs. The aminomonoazo and aminodisazo dyestuffs may contain metal atoms combined by co-ordination links, e.g. chromium, cobalt, nickel or copper atoms. Also, aminoazo dyestuffs which contain metallizable groupings can be reacted with a compound of the Formula II. Dyestuffs of this latter type can either be metallized in substance after metallization or reacted with the fiber in the metal-free form and the dyeings aftertreated with metal-yielding agents.

As stated above, it is possible to arrive at disperse dyestuffs of low water solubility containing an aromatic acyl radical by starting from organic compounds which contain at least one amino group with an exchangeable hydrogen atom plus one substituent capable of dyestuff formation. The azo coupling plays an important part in the reaction giving the final dyestuffs. It can be accomplished by reacting a compound containing at least one highly reactive amino group with an exchangeable hydrogen atom plus one diazotizable amino group of low reactivity with a functional derivative of an aromatic acid, conforming to the invention, diazotizing the intermediate product and coupling the diazo compound with a coupling component to give a disperse dyestuff of low water solubility, or again by reacting a compound containing at least one amino group with an exchangeable hydrogen atom plus a substituent convertible into a diazotizable amino group with a functional derivative of an aromatic acid, conforming to the invention converting the substituent in the intermediate into a diazotizable amino group, diazotizing the amino compound and coupling the diazo compound with a coupling component to give a disperse dyestuff of low water solubility.

Compounds having at least one amino group with an exchangeable hydrogen atom plus a couplable carbon atom, e.g. aminohydroxy compounds, can be condensed with a functional derivative of an organic acid conforming to the invention to give an intermediate product for use as coupling component. Naturally the diazo compound of an aromatic acyl radical of the type defined in the foregoing can also be coupled with a coupling component which likewise contains a radical of this type.

The reaction of the compounds of sparingly water-soluble disperse dyestuffs used as starting products with a functional derivative of an aromatic acid can be conducted in aqueous suspension, in aqueous-organic suspension or solution, or in solution in an inert solvent. The functional derivative of the aromatic acid conforming to the invention can be employed as such in concentrated form or in solution in an organic solvent, suitable solvents being acetone, dioxane, benzene, chlorobenzene and toluene.

The reaction in aqueous-organic or aqueous medium is carried out in the weakly alkaline, neutral to weakly acid region, preferably at pH 7 to 3. The reaction temperature is adjusted to the reactivity of the starting products. To neutralize the halogen halide formed an acid-binding agent such as sodium acetate is added to the reaction solution or suspension at the start of the reaction, or alternatively small portions of sodium or potassium carbonate or bicarbonate in solid pulverized form or in concentrated aqueous solution are added in the course of the reaction. Other suitable neutralizing agents are aqueous solutions of sodium or potassium hydroxide. The addition of small amounts of a wetting or emulsifying agent to the reaction medium can accelerate the rate of reaction.

On completion of condensation or coupling the final disperse dyestuff isolated according to one of the fundamental operations: filtration, evaporation of the solvent, precipitation from the solution with a suitable agent and filtration.

The disperse dyestuffs of low water solubility containing at least one group of Formula I are suitable for the dyeing, padding and printing of hydrophobic fibers and fiber blends, as well as shaped articles of these fibers, e.g. fibers or shaped articles of cellulose ethers and esters and of fully synthetic fibers such as linear polyesters, polyurethanes, polyacrylonitrile, acrylonitrile copolymers, and also mixtures of these fibers or articles, but preferably of synthetic polyamide fibers and of basically modified polyacrylonitrile fibers. The dyeings possess good fastness to light, perspiration, washing, milling, sublimation, pleating, heat setting and sea water. Dyeings, paddings and prints of the said dyestuffs are subjected to heat treatment either during or after the application of the dyestuffs. In the three types of application the commonly used wetting, levelling, thickening and other textile auxiliary agents can be employed, while the heat treatment is carried out to best advantage in presence of agents which combine with hydrogen halide.

Suitable dispersing agents are the condensation products of naphthalene sulfonic acid and formaldehyde and of alkyl phenols and ethylene oxide, also the esters of sulfosuccinic acid, Turkey red oil, soaps and similar agents; these are employed in the presence or absence of protective colloids such as dextrins, British gum, and water-soluble proteins.

Secondary cellulose acetate is sensitive to temperatures above 90° C. and must be dyed at 60–85° C., whilst cellulose triacetate can be dyed at 95–100° C.

The fully synthetic fibers (linear aromatic polyesters, polyamides, polyurethanes, polyacrylonitrile, polyvinyl chloride) can be dyed at 60–100° C. At temperatures above 100° C. dyeing is carried out under pressure.

An alkaline aftertreatment is advisable for dyeings on polyamide fibers in order to improve the washing fastness.

The dyed fibers can be washed with warm water which may contain a synthetic detergent if necessary, and are then rinsed and dried. In certain cases the treatment can be carried out in one operation using an inorganic or organic base or an alkaline soap or an alkaline detergent.

The disperse dyestuffs of this invention are suitable for printing synthetic fibers with the aid of dispersing agents; for this purpose alkaline substances such as e.g. sodium bicarbonate are used. The print pastes are prepared with the normal additions such as urea, thiourea etc.

In the following examples the parts and percentages are by weight and the temperatures in degrees centigrade.

EXAMPLE 1

22.7 parts of 2-hydroxy - 5 - methyl-4'-amino-1,1'-azobenzene are dissolved in 200 parts of dioxane and 200 parts of water. The yellow solution formed is cooled to 0° and 23 parts of 4-chloro-methylbenzene-1-carboxylic acid chloride in 500 parts of acetone are gradually added with stirring. By simultaneous addition of sodium acetate a constant pH of 6 is obtained. Stirring is continued for 2 hours at 0–2°, then the mass is diluted with 500 parts of water, the precipitated dyestuff filtered off and the presscake washed and carefully dried with vacuum at 40°.

The new dyestuff, which is a yellow powder and can be recrystallized from glacial acetic acid (melting point 200°), dyes synthetic polyamide fibers such as nylon and Perlon (registered trademark) from fine aqueous dispersion in yellow shades possessing good light and wet fastness. To improve the dyestuff's dispersibility it can be previously ground in the dry state with e.g. equal amounts of monosodium phosphate and sodium dinaphthylmethane sulfonate, or the presscake can be mixed with a suitable dispersing agent, the mixture ground in the wet state and the resulting paste carefully dried so as not to impair the enhanced dispersibility.

1 part of the dyeing prepartion thus obtained is dispersed in 20 parts of water and the dispersion added to 4000 parts of water containing 4 parts of a condensation product of ethylene oxide and a fatty alcohol. 100 parts of a nylon fabric are added, the dyebath heated to 95° and maintained at this temperature for 1 hour. The dyed fabric is removed, rinsed with water, treated for 1 hour at 100° in a solution of 0.1% soap and 0.1% sodium carbonate, rinsed again and dried. It is dyed yellow and possesses good light and washing fastness.

EXAMPLE 2

22.7 parts of 2-hydroxy - 5 - methyl-4'-amino-1,1'-azobenzene are dissolved in 300 parts of glacial acetic acid. 30 parts of anhydrous sodium acetate are added, followed at 80° by 23 parts of 4-chloromethylbenzene-1-carboxylic acid chloride. After a few hours the reaction product crystallizes out in the pure form and is separated by filtration. It is identical with the dyestuff obtained according to Example 1.

In the following table amino dyestuffs are listed in column II from which are derived the reactive disperse dyestuff conforming to the invention and containing a radical of the formula

The amino groups which react with a functional derivative of the chloromethylbenzene carboxylic acid are underlined. Column III gives the shade of the dyeings and prints on synthetic polyamide fibers.

*Table*

| Example (I) | (II) | (III) |
|---|---|---|
| 3 | 4-Amino-2-hydroxy-4'-methoxy-1,1-azobenzene | yellow. |
| 4 | 3-methyl-1-(4'amino-2'-nitro)-phenylazo-5-pyrazolone. | Do. |
| 5 | 4-amino-2',5'-dimethoxy-4'-phenylazo-1,1'-azobenzene. | orange. |
| 6 | 4-[N-(2'-amino)-ethyl-N-ethyl]-amino-2-methyl-2'-chloro-4'-methylsulfonyl-1,1'-azobenzene. | Do. |
| 7 | 1-[4-N-(2'-amino)-ethyl-N-(2'-cyano)-ethyl-amino]-phenylazo-4-methylsulfonylnapthalene. | scarlet. |
| 8 | 2-amino-4-di-[(2'-hydroxy)-ethyl]-amino-2'-cyano-4'-methylsulfonyl-1,1'-azobenzene. | red. |
| 9 | 1-[4'-(2''-amino)-ethoxy]-phenyl-amino-2-nitrobenzene-4-sulfonic acid phenylamide. | yellow. |
| 10 | 4-amino-2-acetylamino-2'-chloro-1,1'-azobenzene. | Do. |
| 11 | 4-amino-2'-chloro-4'-methylsulfonyl-1,1'-azobenzene. | Do. |
| 12 | 4-amino-2-methoxy-2'-hydroxy-5-methyl-1,1'-azobenzene. | Do. |

Dyestuffs having similar properties are obtained when the 4-chloromethylbenzene-1-carboxylic acid chloride used in the production of the dyestuffs of Examples 1 to 12 is replaced by one of the following acid halides:

3-chloromethylbenzene-1-carboxylic acid chloride,
3-bromomethylbenzene-1-carboxylic acid bromide,
4-bromomethylbenzene-1-carboxylic acid bromide,
3-chloro-4-chloromethylbenzene-1-carboxylic acid chloride,
3,5 - dichloro - 4-chloromethylbenzene - 1-carboxylic acid chloride,
4-chloromethylbenzene sulfonic acid chloride.

EXAMPLE 13

20.5 parts of 1-amino-2-chloro-4-methylsulfonylbenzene are added at 15–20° to nitrosylsulfuric acid produced with 100 parts of concentrated sulfuric acid and 7 parts of sodium nitrite. The mass is stirred for 4 hours at 20°, then run into a mixture of 350 parts of water and 600 parts of ice, and the small excess of nitrous acid destroyed with amidosulfonic acid. A solution of 32 parts of N - ethyl - N - [2' - (4''-chloromethylbenzenecarbonyl)-aminoethyl]-aminobenzene in 15 parts of concentrated sulfuric acid, 50 parts of water and 15 parts of concentrated sulfuric acid, 50 parts of water and 15 parts of ice is added, upon which the dyestuff formed is precipitated. It is filtered off, washed neutral with water and dried at 40° with vacuum. It is obtained as an orange-coloured powder which dyes polyamide fibers from aqeuous dispersion in orange shades fast to light and washing.

The same dyestuff is obtained when the aforenamed diazo compound is coupled with N-ethyl-N-2'-aminoethylaminobenzene and the intermediate product reacted with 4-chloromethylbenzene carboxylic acid chloride.

N - ethyl - N - [2'-(4''-chloromethylbenzenecarbonyl)-aminoethyl]-aminobenzene can be produced in the following way: 16.4 parts of N-ethyl-N-2'-aminoethylaminobenzene are dissolved in 400 parts of acetone at 20°. 20 parts of 4-chloromethylbenzene carboxylic acid chloride are added, the temperature increased to the boil with reflux, and an aqueous solution of 15 parts of crystallized sodium acetate slowly dropped in. On completion of acylation the acetone is distilled off at reduced pressure and the residue, an aqueous suspension, is either used for coupling after the addition of hydrochloric acid and ice or the acylation product is isolated from it in the normal way.

PRINTING METHOD

A printing paste is made with 10 parts of a 7.5% aqueous dispersion of dyestuff No. 9 of the table, 41 parts of water, 2 parts of an aqueous solution of sulfonated pine oil and sulfonated sperm oil, 1 part of sodium 3-nitrobenzene-1-sulfonate, 5 parts of a 5% sodium alginate solution and 1 part of sodium bicarbonate. The paste is printed on a fabric of secondary cellulose acetate, and the print dried, steamed 30 minutes, rinsed in water, soaped at 50° in a 0.2% soap solution, rinsed again and dried. The yellow print is fast to light and washing.

Formulae of representative dyes of the foregoing examples are as follows:

EXAMPLE 1

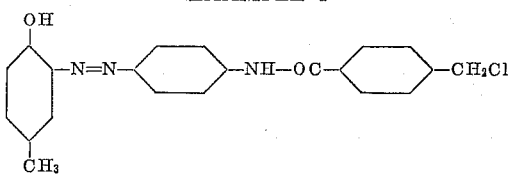

EXAMPLE 6

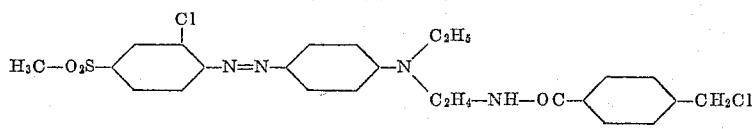

EXAMPLE 10

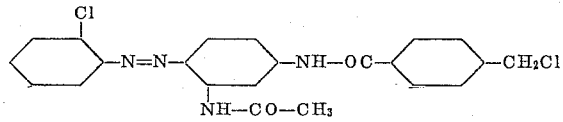

Disperse dye with the rest of the reactive system of column 4.

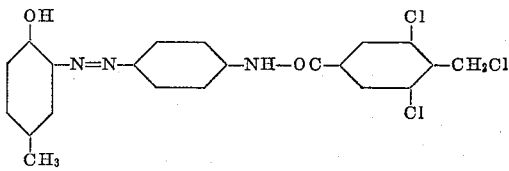

Disperse dye with the rest of the reactive system of column 4.

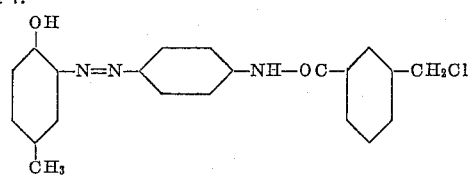

Having thus disclosed the invention what I claim is:
1. Dyestuff of the formula

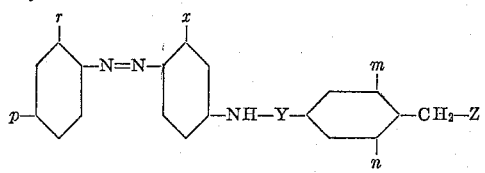

wherein
x is a member selected from the group consisting of hydrogen, hydroxy, chlorine, acetylamino and methoxy,
Y is a member selected from the group consisting of —CO— and —SO$_2$—,
Z is a member selected from the group consisting of Cl and Br,
m and n are members selected from the group consisting of hydrogen and chlorine,
r is a member selected from the group consisting of hydroxy, chlorine and hydrogen, and
p is a member selected from the group consisting of methoxy and methylsulfonyl.

2. Dyestuff of the formula

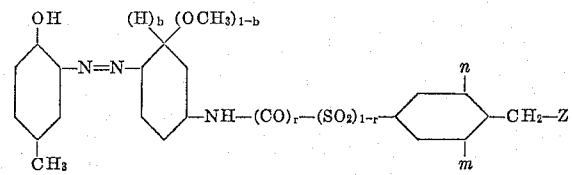

wherein
r is an integer of 0 to 1,
Z is halogen of atomic number from 17 to 35, inclusive,
b is an integer between 0 and 1, and
m and n are members selected from the group consisting of hydrogen and chlorine.

3. The disperse dye of the formula

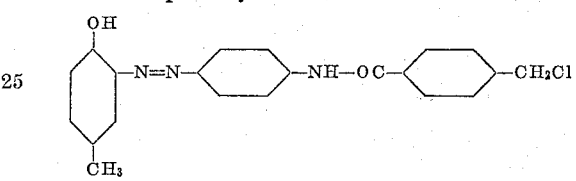

4. The disperse dye of the formula

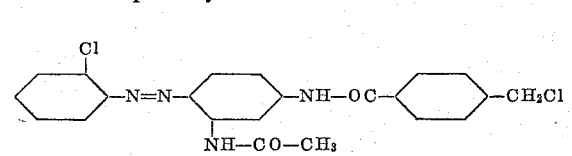

5. The disperse dye of formula

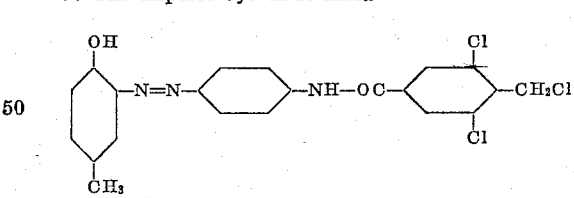

6. The disperse dye of formula

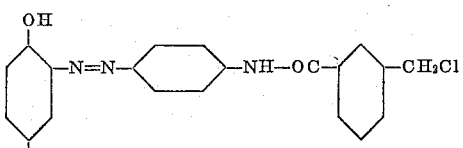

References Cited in the file of this patent
UNITED STATES PATENTS
2,864,816   Nicolaus et al. _____ Dec. 16, 1958
FOREIGN PATENTS
565,448   Belgium _____ Sept. 6, 1958
963,457   Germany _____ May 9, 1957
OTHER REFERENCES
Wegmann, J.: Textil-Praxis, October 1958, pages 1056–61.